No. 731,158. PATENTED JUNE 16, 1903.
L. R. BLACKMORE.
FLOOR OR WALL TILE.
APPLICATION FILED JUNE 11, 1902.
NO MODEL. 3 SHEETS—SHEET 1.

Attest:
L. Lee.
Arthur Heaton

Inventor.
Lawrence R. Blackmore,
per Thomas S. Crane, Atty.

No. 731,158. PATENTED JUNE 16, 1903.
L. R. BLACKMORE.
FLOOR OR WALL TILE.
APPLICATION FILED JUNE 11, 1902.
NO MODEL. 3 SHEETS—SHEET 2.
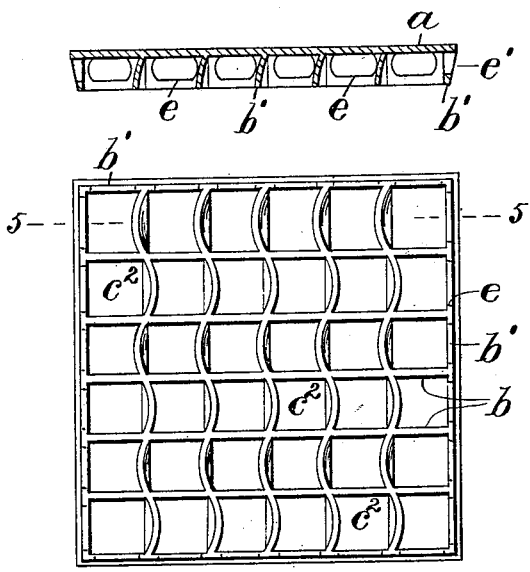
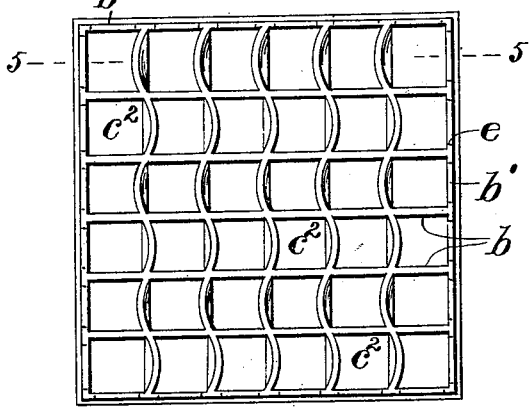
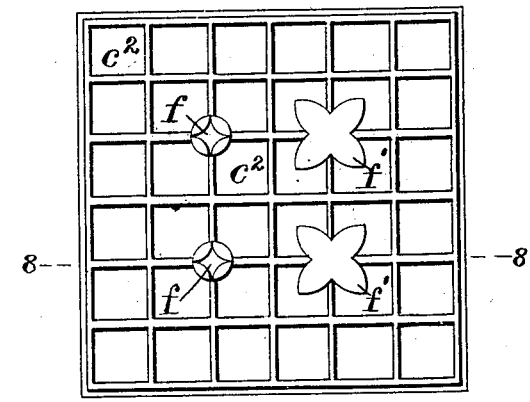
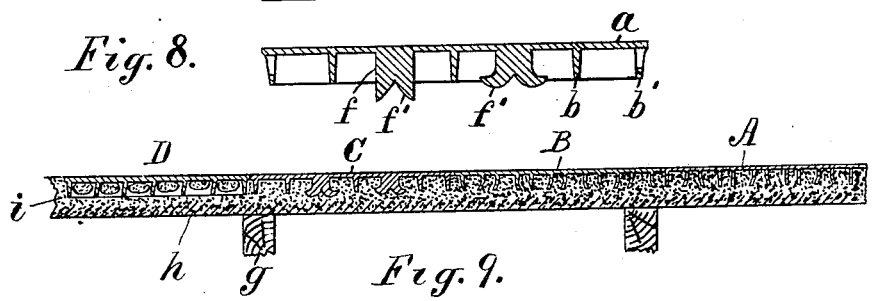
Attest:
L. Lee
Arthur Heaton
Inventor.
Lawrence R. Blackmore,
per Thomas S. Crane, Atty.

No. 731,158. PATENTED JUNE 16, 1903.
L. R. BLACKMORE.
FLOOR OR WALL TILE.
APPLICATION FILED JUNE 11, 1902.
NO MODEL. 3 SHEETS—SHEET 3.

Attest:
L. Lee.
A. F. Heaton.

Inventor.
Lawrence R. Blackmore,
per Thomas S. Crane, Atty.

No. 731,158. Patented June 16, 1903.

UNITED STATES PATENT OFFICE.

LAWRENCE R. BLACKMORE, OF ARLINGTON, NEW JERSEY.

FLOOR OR WALL TILE.

SPECIFICATION forming part of Letters Patent No. 731,158, dated June 16, 1903.

Application filed June 11, 1902. Serial No. 111,091. No model.)

*To all whom it may concern:*

Be it known that I, LAWRENCE R. BLACKMORE, a subject of the King of Great Britain, residing at 101 Pleasant Place, Arlington, county of Hudson, and State of New Jersey, have invented certain new and useful Improvements in Floor or Wall Tiles, fully described and represented in the following specification and the accompanying drawings, forming a part of the same.

The tile claimed herein is designed particularly for facing walls, ceilings, and other parts of apartments where hygienic conditions must be carefully maintained and where the reflection of light is important, as in tunnels, subways, cellars, cold-storage vaults, refrigerators, and similar apartments.

The tile is formed of molded glass to secure the desired hygienic conditions, as the surface of such tiles does not craze or crack like the glazing upon porcelain tiles, and therefore presents a permanent resisting surface to dampness, vapors, grease, and all other substances liable to foul the tile and pollute the atmosphere.

The construction relates to that class of tiles which is formed with intersecting ribs upon the back or parallel rows of recessed chambers and is preferably formed with marginal ribs along its edges; and the invention consists in an improved form of rib to interlock with the cement without materially diminishing the receiving capacity of the chambers and partly in the use of corresponding perforations through the marginal ribs to interlock with the cement when bedded therein and to form connecting-studs between adjacent tiles.

The details of construction will be understood by reference to the annexed drawings, in which—

Figure 1:
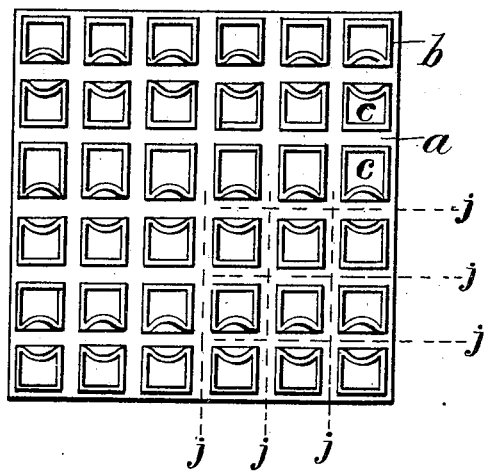
Figure 2:
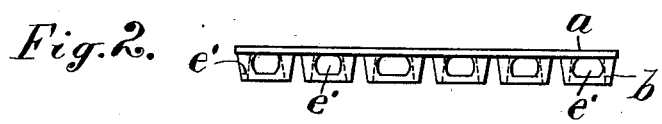
Figure 3:
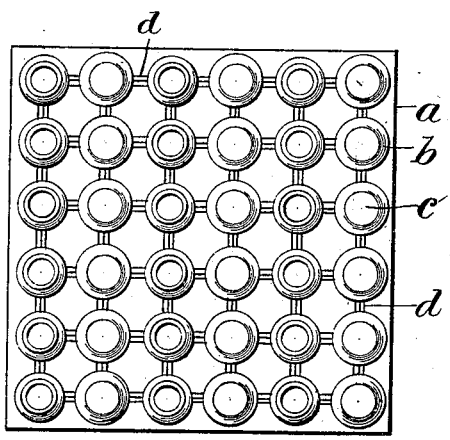
Figure 4:
Figure 10:
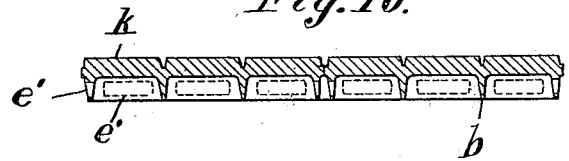
Figure 11:
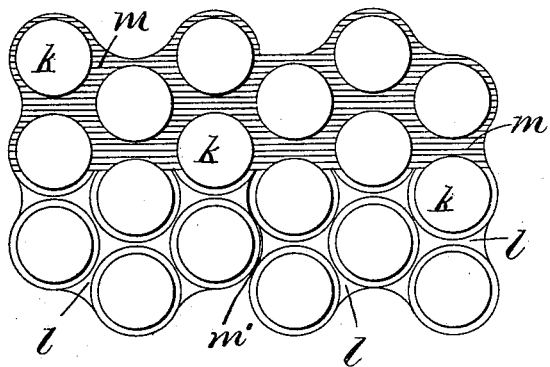
Figure 12:
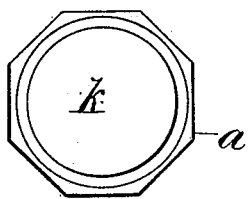
Figure 13:
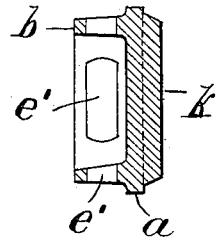

Figure 1 shows the rear side of a tile with rows of chambers having an initial square form and one edge of each chamber bent. Fig. 2 is an edge view of the tile shown in Fig. 1. Fig. 3 shows the rear side of a tile with rows of chambers having an initial cylindrical form and the outer edges bent. Fig. 4 is a section through the centers of a row of the chambers shown in Fig. 3. Fig. 5 is a section line on line 5 5 in Fig. 6. Fig. 6 shows the rear side of a tile with intersecting ribs forming row of initial chambers with the chambers in the adjacent rows having their sides reversely bent. Fig. 7 shows the rear side of a tile with intersecting ribs and split studs upon the back with two of such studs upset. Fig. 8 is a cross-section on line 8 8 in Fig 7 and Fig. 9 shows part of a wall in section, with tiles similar to those in the preceding figures. Fig. 10 is a section on line 10 10 in Fig. 11. Fig. 11 shows the outer side of two tiles having buttons upon the face and cement inserted between a portion of the buttons. Fig. 12 shows the outer side of an octagon tile having a button upon its face, and Fig. 13 is a cross-section of the same.

In Figs. 1 to 4, inclusive, $a$ designates the front plate of the tile, the front side of which is exposed to view. $b$ designates the integral ribs, which form recessed chambers $c$ or $c'$ upon the back of the tile. Referring to Figs. 1 and 2, the ribs form six parallel rows of chambers $c'$, molded primarily of square form. The chambers are separated by interspaces $d'$, and while the ribs are soft and hot a suitable former is pressed between the adjacent sides of the chambers to tip the upper edges apart at the middle of their width, which forces such edges partly into the cavities of the chambers. Referring to Figs. 3 and 4, portions of the ribs form six parallel rows of circular chambers, which are primarily made cylindrical to be readily molded, and the edge of the rib is then bent while hot and soft to contract or expand the mouth of the chamber. Each row contains six chambers, which are connected by integral ribs $d$ about half the height of the chambers. Three rows of the chambers are shown with the edges of the rib tipped inwardly, thus contracting the mouth of the chamber, while the other three rows are shown with the edge of the rib tipped outwardly, thus making the chamber funnel-shaped. Only the outer half of the rib is tipped, leaving the portion cylindrical which is next the tile-plate. The chambers and the ribs $d$ form continuous projections extending across the back of the tile in both directions and strengthening it very materially.

In Figs. 5 and 6 marginal ribs $b'$ are projected from the back of the tile and intersecting ribs $b$ are extended across the tile between the ribs $b'$, forming six rows of primarily square chambers $c^2$. The transverse ribs $b$ in each row are so tipped while hot in one direction that the walls of the chambers are tipped in opposite directions in alternate rows, thus securing a firm interlocking of the ribs with the cement.

With the construction shown in Figs. 1 to 6 certain of the ribs upon the tile are tipped in opposite directions, so as to positively interlock with the cement and render the displacement of the tile impossible without breaking the cement. To make the interlocking of the tile still more effective, the marginal ribs $b'$ may be formed upon the tile, as shown in Figs. 5 to 8, inclusive, with holes $e$, visible only from the edges of the tile, as shown in Fig. 5. One of the marginal openings $e$ extends into each of the marginal chambers and the openings are thus in corresponding positions upon all the different sides of the tile, so that whichever sides may be placed adjacent when set in the wall the openings will be opposite to one another and the cement will extend from one opening to the other and connect the interiors of two adjacent chambers with a solid stud of cement. The plate $a$ is projected at each edge of the tile slightly beyond the marginal rib, so that when the tiles are set together, as shown in Fig. 9, a small interspace is formed in which the cement presses and attaches the edges of the tiles together and from which space the cement extends into the opposed rows of holes $e$. The bending of the edges of the ribs and the connecting of the recessed chambers upon adjacent tiles by the cement studs in the holes is of very great value, as it locks the tiles together and to the wall with the utmost firmness and renders it impossible to displace them without breaking a great portion of the cement.

Figs. 7 and 8 show a slight modification of the means for locking the ribs to the cement, consisting of studs $f$, formed at the intersection of the ribs $b$ and split upon the end, as shown upon two of the studs, to form tongues $f'$, which when hot may be readily bent down or upset, as shown, upon the other two studs in Figs. 7 and 8. When thus bent, the tongues $f'$ are undercut or adapted to interlock with the cement which enters the four chambers adjacent to the stud.

Fig. 9 shows the operation of the various devices when the tiles are set in a wall, $g$ showing the wall-joists, $h$ a metal lath thereon, and $i$ the cement in which the ribs of the tile are bedded.

A is applied to a tile like that shown in Fig. 2, B to a tile like that shown in Fig. 3, C to a tile like that shown in Fig. 7, and D to a tile like that shown in Fig. 6.

With the tile as shown in Fig. 6 the space in the chambers is not contracted excepting at one end of each row, while with the other constructions the edges only of the tile are bent and the capacity of the chambers is slightly affected, while the bent edge of the tile is interlocked firmly with the cement.

For lining apartments where light is desired the reflection of the light is materially increased by forming the tile of translucent glass, with any of the numerous integral projections described above upon its rear side, as such projections are not only adapted to penetrate and engage the wall cement, but to reflect light through the plate, which increases its illuminating properties.

Where the tile is applied to covering floors, a mosaic effect is readily produced by forming integral buttons or projections of uniform height upon the top or front side of the tile-plate, with intermediate channels to receive cement or plastic substance of a different color from the said buttons. Tiles to produce such effect are shown in Figs. 10 to 13, inclusive, the integral buttons $k$ being disposed with interspaces $l$ to receive the differently-colored cement. Such cement is indicated by the parallel lines $m$ at the ends of the tiles shown in Fig. 11, which serve to darken the interspaces and the joint between the tiles to contrast with the surfaces of the adjacent buttons. The buttons being of circular form and arranged alternately in adjacent rows, their edges slightly interlock or penetrate, forming interlocking rows or projections and interspaces. The margins of the tile-plates $a$ are shown in Fig. 11 suitably indented to form joints between the several projections, so that when a plurality of such tiles is laid with the edges contiguous the projections may alternate in the required manner.

Figs. 12 and 13 show the tile with a single chamber upon the back and a single circular projection upon the front, such projection having a diameter a little smaller than the octagonal plate $a$, with which it is integral. A series of such tiles may be laid contiguous when such tiles are laid, the projection of the plates $a$ at the several edges of the abutments $k$ producing the required interspaces, in which cement may be inserted to produce the mosaic effect. The cement completely covers the joints $m'$ between the tiles when constructed and laid in this manner, as shown in Fig. 11, and thus produces a close imitation of mosaic work. The tile formed with the projections upon the front, as shown in Fig. 10, is provided with the chambers upon the back having walls inclined or upset to interlock positively with the cement.

The formation of the ribs upon the back into separate recessed chambers permits the tile to be readily cut upon the lines of division between the chambers and provides each of such cut sections with one or more of the chambers adapted fully to lock with the cement upon the wall by means of the bent rib or the hole $e'$, formed through the rib. Tiles having rows of recessed chambers upon the back can thus be used to great advantage in forming mosaic flooring or wall-patterns, as tiles of different colors may be formed with such recessed chambers and then divided into sections which may be used in combination with sections of different colors to form the desired pattern.

In Fig. 1 dotted lines marked *j* are placed upon one corner of the tile to indicate the lines where the plate *a* may be readily divided, and as there is no connection between the ribs which form the chambers the plate *a* is thus readily cut by a diamond and broken into sections of the desired size. Such sections may include any multiple of such recessed chambers, so as to form sections of various sizes from the same tile.

Having thus set forth the nature of the invention, what is claimed herein is—

1. The molded-glass wall-tile herein described, having upon the back integral projecting ribs forming rows of recessed chambers, the walls of various chambers being inclined or upset in reverse directions to interlock positively with the cement when bedded therein.

2. The molded-glass wall-tile herein described, having upon the back integral projecting ribs forming rows of recessed chambers, the walls of various chambers being inclined or upset in reverse directions and the tile having a marginal rib with perforations adapted to interlock with the cement when bedded therein.

3. The molded-glass wall-tile herein described, having upon the back integral projecting ribs forming rows of recessed chambers, the walls of various chambers being inclined or upset in reverse directions, and the tile having marginal ribs upon its edges with corresponding perforations therein, adapted to interlock with the cement when bedded therein and to form a tie between the adjacent tiles.

4. The molded-glass wall-tile having upon the back integral projecting ribs forming rows of recessed chambers, the walls of the chambers being bent at their outer edges only and adapted to interlock with the cement when bedded therein.

5. A molded-glass tile having an integral projecting rib around the margin upon the back with perforations to interlock with the cement, and intersecting ribs having their outer edges only bent, and in reverse directions, to interlock with the cement.

6. A molded translucent-glass wall-tile with front plate having upon the back numerous integral projections to penetrate the wall-cement and adapted to reflect light through the plate, and having upon its several edges a marginal flange with similarly-disposed perforations adapted to interlock with the cement and to form connecting-studs between adjacent tiles.

7. A molded-glass tile having upon the back parallel intersecting rows of separated recessed chambers whereby the tile may be divided upon the various lines between the chambers.

8. A molded-glass tile having upon the back integral projecting ribs forming recessed chambers with the walls of the chambers inclined or upset to interlock positively with the cement when bedded therein, and the front of the tile having mosaic projections and interspaces, as and for the purpose set forth.

9. A molded-glass tile having upon the back integral projecting ribs forming recessed chambers with the walls of the chambers inclined or upset to interlock positively with the cement when bedded therein, and the front of the tile having interlocking rows of mosaic projections and interspaces, as and for the purpose set forth.

10. A series of molded tiles laid contiguous, each having upon the front a series of mosaic projections and interspaces, and cement secured in such interspaces, of color to contrast with the said projections and thereby produce a mosaic effect.

11. A series of molded tiles laid contiguous, each having upon the front a series of mosaic projections and interspaces, and also interspaces covering the joints of the tiles, and cement secured in all of such interspaces of color to contrast with the said projections, whereby the cement entirely conceals the joints of the tiles and an unbroken mosaic effect is produced.

In testimony whereof I have hereunto set my hand in the presence to two subscribing witnesses.

LAWRENCE R. BLACKMORE.

Witnesses:
L. LEE,
THOMAS S. CRANE.